United States Patent
Mathon et al.

(10) Patent No.: US 9,434,111 B2
(45) Date of Patent: Sep. 6, 2016

(54) MACHINE FOR WINDING A FIBER TEXTURE ONTO AN IMPREGNATION MANDREL, AND THE USE OF SUCH A MACHINE FOR MAKING A GAS TURBINE CASING OUT OF COMPOSITE MATERIAL

(75) Inventors: Richard Mathon, New Castle, DE (US); Antoine Phelippeau, Portsmouth, NH (US); Micah Gummel, East Kingston, NH (US); Jean-Francois Durand, Baraqueville (FR)

(73) Assignee: SNECMA, Paris (FR)

( * ) Notice: Subject to any disclaimer, the term of this patent is extended or adjusted under 35 U.S.C. 154(b) by 166 days.

(21) Appl. No.: 14/111,368

(22) PCT Filed: Apr. 10, 2012

(86) PCT No.: PCT/FR2012/050769
§ 371 (c)(1),
(2), (4) Date: Oct. 11, 2013

(87) PCT Pub. No.: WO2012/140355
PCT Pub. Date: Oct. 18, 2012

(65) Prior Publication Data
US 2014/0027046 A1    Jan. 30, 2014

(30) Foreign Application Priority Data

Apr. 13, 2011   (FR) ...................................... 11 53212

(51) Int. Cl.
*B29C 70/32*    (2006.01)
*B29C 53/56*    (2006.01)
(Continued)

(52) U.S. Cl.
CPC ............ *B29C 70/32* (2013.01); *B29C 53/562* (2013.01); *B65H 18/103* (2013.01);
(Continued)

(58) Field of Classification Search
CPC ............ B29C 53/562; B29C 53/8075; B29C 2053/8025; B29C 70/32; B32B 37/0046; B65H 18/103; B65H 23/0328; B65H 2557/51; B65H 2701/177
USPC .................. 156/64, 173, 361, 367, 368, 433
See application file for complete search history.

(56) References Cited

U.S. PATENT DOCUMENTS 3,300,355 A    1/1967 Adams
4,626,306 A *  12/1986 Chabrier et al. .............. 156/180
(Continued)

FOREIGN PATENT DOCUMENTS

FR    2 656 826    7/1991
WO    96 19335     6/1996

OTHER PUBLICATIONS

Translation of FR 2656826, Jul. 12, 1991, France.*
(Continued)

*Primary Examiner* — George Koch
(74) *Attorney, Agent, or Firm* — Oblon, McClelland, Maier & Neustadt, L.L.P.

(57) ABSTRACT

A winding machine for winding a fiber texture on an impregnation mandrel, the winding machine including: a takeup mandrel for storing a fiber texture, the takeup mandrel having an axis of rotation; an impregnation mandrel for having superposed layers of the fiber texture stored on the takeup mandrel wound thereon, the impregnation mandrel having an axis of rotation that is substantially parallel to the axis of rotation of the takeup mandrel; at least one electric motor for driving the mandrels in rotation about their respective axes of rotation; and a control unit for controlling the at least one electric motor for driving the mandrels in rotation.

9 Claims, 8 Drawing Sheets

(51) Int. Cl.
    *B65H 23/032* (2006.01)
    *B65H 18/10* (2006.01)
    *B29C 53/80* (2006.01)

(52) U.S. Cl.
    CPC ...... *B65H 23/0328* (2013.01); *B29C 53/8075* (2013.01); *B29C 2053/8025* (2013.01); *B65H 2557/51* (2013.01); *B65H 2701/177* (2013.01)

(56) References Cited

U.S. PATENT DOCUMENTS

| | | | | |
|---|---|---|---|---|
| 5,277,373 A | * | 1/1994 | Morton | .................. B65H 9/385 226/44 |
| 5,876,544 A | | 3/1999 | Yamamoto et al. | |
| 6,192,958 B1 | | 2/2001 | Yamamoto et al. | |
| 2007/0011858 A1 | * | 1/2007 | Maxwell | ................ B23K 31/02 29/431 |
| 2009/0043533 A1 | * | 2/2009 | Brennan et al. | .............. 702/152 |
| 2009/0098337 A1 | | 4/2009 | Xie et al. | |

OTHER PUBLICATIONS

Lipson et al, Inside Machines: PC versus PLC: Comparing control options, May 11, 2011, downloaded from: http://www.controleng.com/single-article/inside-machines-pc-versus-plc-comparing-control-options/9bf8690c6f23b11370bec90b52cb15c9.html on Jan. 5, 2016.*

International Search Report Issued Jul. 16, 2012 in PCT/FR12/50769 Filed Apr. 10, 2012.

* cited by examiner

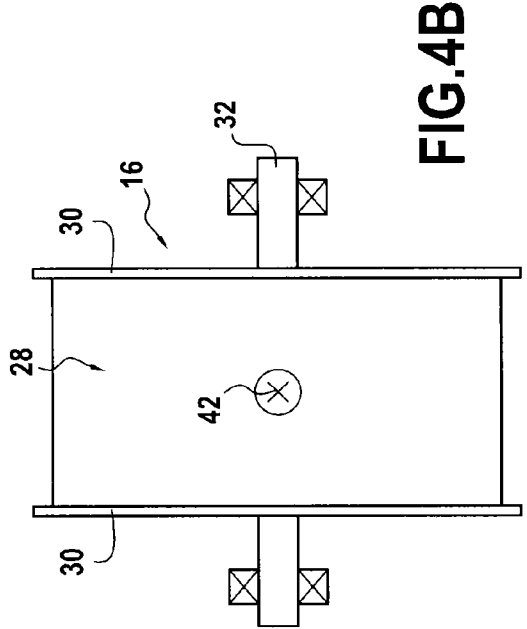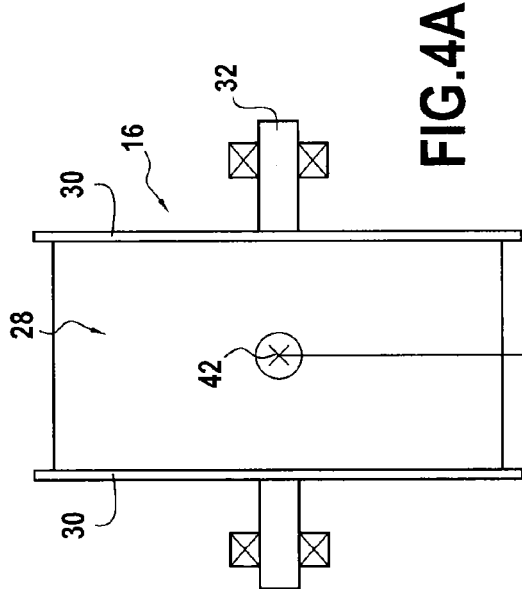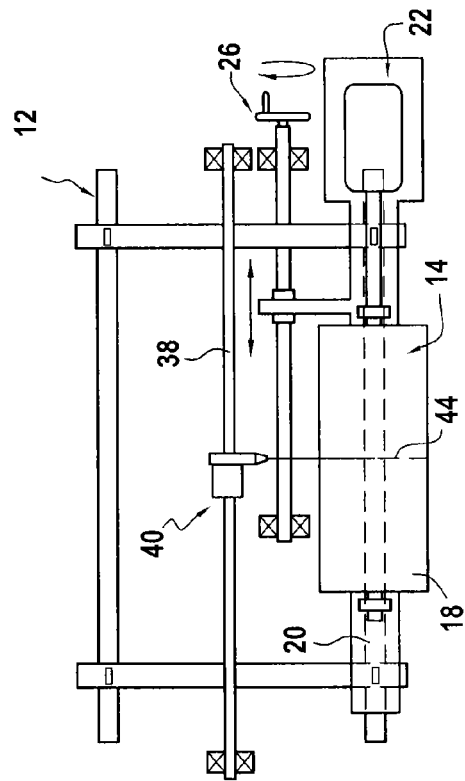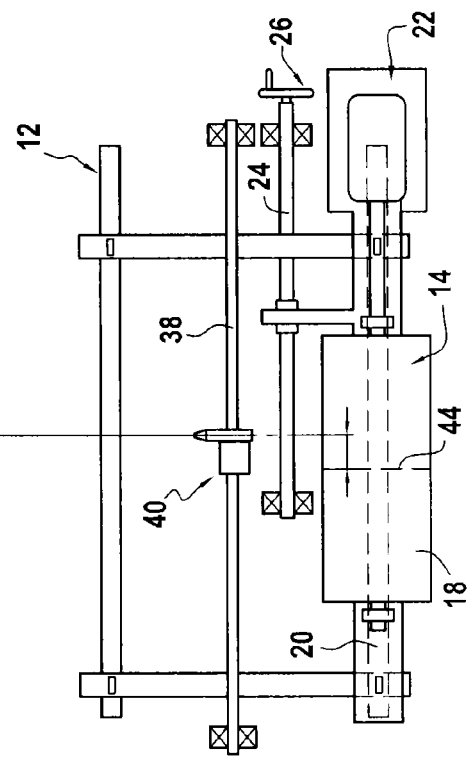

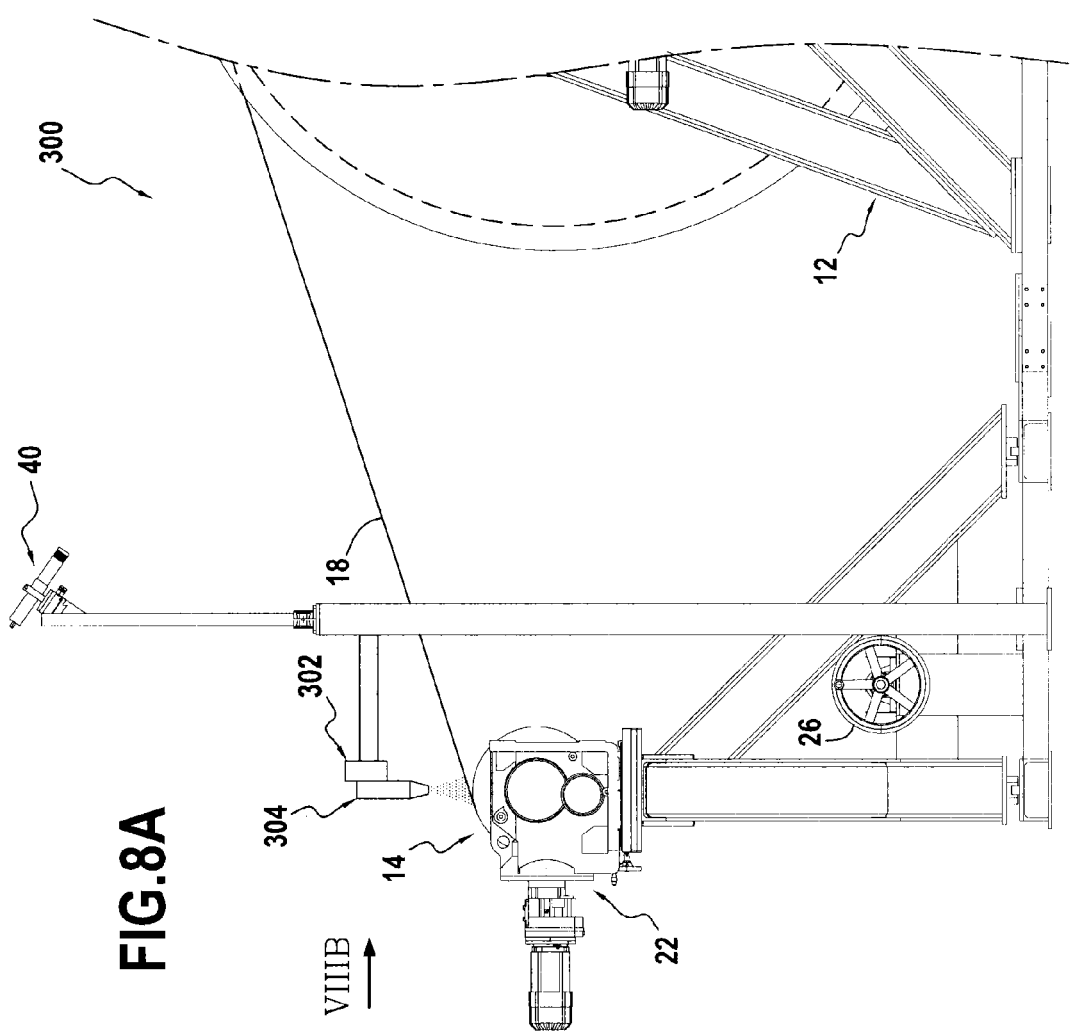
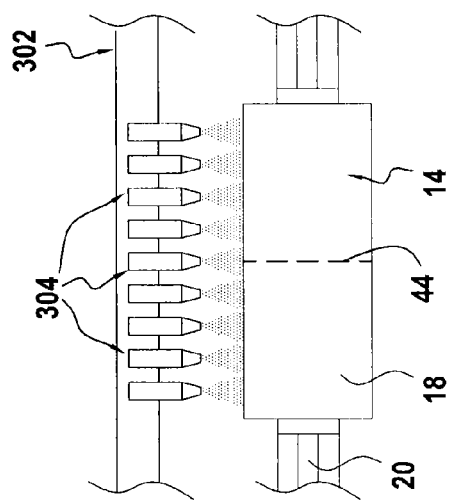

MACHINE FOR WINDING A FIBER TEXTURE ONTO AN IMPREGNATION MANDREL, AND THE USE OF SUCH A MACHINE FOR MAKING A GAS TURBINE CASING OUT OF COMPOSITE MATERIAL

This application is a national stage entry of PCT/FR2012/050769, filed Apr. 10, 2012.

BACKGROUND OF THE INVENTION

The present invention relates to the general field of making gas turbine casings out of composite material, and it relates more particularly to gas turbine fan retention casings for aeroengines.

In a gas turbine aeroengine, a fan casing performs several functions: it defines the air inlet passage into the engine, it supports an abradable material facing the tips of the fan blades, it supports an optional structure for absorbing sound waves for acoustic treatment at the inlet of the engine, and it incorporates or supports a retention shield. The shield constitutes a trap for retaining debris, such as ingested articles or fragments of damaged blades that are thrown outwards by centrifuging, in order to prevent them from passing through the casing and reaching other portions of the aircraft.

A fan retention casing is commonly constituted by a relatively thin wall defining the air inlet passage and supporting an abradable material overlying the path followed by the tips of the fan blades, together with the acoustic treatment coating, if any, and also by a shield structure that is fastened to the outside of this wall, level with the fan.

Proposals have already been made to make a fan retention casing out of composite material. By way of example, reference may be made to document EP 1 961 923, which describes fabricating a composite material casing of thickness that varies and that includes forming fiber reinforcement in the form of superposed layers of a fiber texture and densifying the fiber reinforcement with a matrix. More precisely, that document makes provision for using a takeup mandrel for three-dimensional weaving of the fiber texture, which texture is then wound as superposed layers onto an impregnation mandrel having a profile corresponding to the profile of the casing that is to be made. The fiber preform as obtained in that way is held on the impregnation mandrel and it is impregnated with resin prior to the resin being polymerized.

In practice, performing this method raises the problem of transferring the fiber texture from the takeup mandrel to the impregnation mandrel. In particular, prior to being wound, it is necessary to ensure that the fiber texture is placed accurately on the impregnation mandrel. In addition, during the winding operation, the tension applied to the fiber texture must be under constant control. This tension determines the level with which the superposed layers of fiber texture are compacted on the impregnation mandrel, and thus determines the fiber density in the resulting fiber preform.

Consequently, there exists a need to have a winding machine that makes it possible, during the transfer of the fiber texture from the takeup mandrel to the impregnation mandrel, to ensure both that the fiber texture is correctly placed on the impregnation mandrel and that an appropriate winding tension is applied.

OBJECT AND SUMMARY OF THE INVENTION

A main object of the present invention is thus to mitigate such a need by proposing a winding machine for winding a fiber texture on an impregnation mandrel, the machine comprising:

a takeup mandrel for storing a fiber texture, the takeup mandrel having an axis of rotation;

an impregnation mandrel for having superposed layers of the fiber texture stored on the takeup mandrel wound thereon, the impregnation mandrel having an axis of rotation that is substantially parallel to the axis of rotation of the takeup mandrel;

at least one electric motor for driving the mandrels in rotation about their respective axes of rotation; and a control unit for controlling the electric motor(s) for driving the mandrels in rotation.

The winding machine is also remarkable in that it presents a control unit for the electric motor(s) for driving the mandrels in rotation. By controlling the motor(s) in this way, it is possible to control the winding tension applied to the fiber texture while it is being wound onto the impregnation mandrel. By controlling this winding tension, and as a function of the nature of the fiber texture, it is thus possible to determine and to control the density of fibers in the resulting preform.

This provides a winding machine that is well adapted to making fan retention casings out of composite material for an aeroengine. In particular, the operation of the machine can be fully automated, thereby contributing to reducing the fabrication cycle time of such casings.

Preferably, the control unit for controlling the electric motor(s) of the winding machine comprises means for controlling the induction current of an electric motor of the takeup mandrel in order to wind the fiber texture onto the impregnation mandrel while exerting controlled tension thereon.

Also preferably, the winding machine further comprises optical sighting means for aligning the takeup mandrel on the impregnation mandrel prior to winding the fiber texture onto the impregnation mandrel and for correcting any defect in the alignment of the takeup mandrel on the impregnation mandrel during said winding operation.

These optical sighting means of the winding machine may comprise an optical sighting system mounted on a crossbeam vertically above the mandrels, a visual marker positioned on the impregnation mandrel, and a system for moving the takeup mandrel in translation.

The winding machine may further comprise both an additional mandrel for storing a reinforcing fiber fabric, the additional mandrel having an axis of rotation that is substantially horizontal and parallel to the respective axes of rotation of the mandrels, and also an electric motor for driving rotation of the additional mandrel about its axis of rotation.

The winding machine may further comprise heater means for heating the fiber texture prior to the texture docking on the impregnation mandrel. Heating the fiber texture before it docks on the impregnation mandrel makes it easier for it to be shaped and compacted on the mandrel. Advantageously, the fiber texture heater means comprise radiant heater units or hot air blower units positioned on the path of the fiber texture between the takeup mandrel and the impregnation mandrel and facing each of the faces of the texture.

Likewise, the winding machine may comprise water spray means for spraying water on the fiber texture prior to the texture docking on the impregnation mandrel. Spraying water on the fiber texture prior to the texture docking on the impregnation mandrel also makes it easier to shape it on the mandrel and considerably increases its compacting during winding. Advantageously, the water spray means for spraying water on the fiber texture comprise a strip carrying a plurality of water spray nozzles positioned vertically above the takeup mandrel.

The invention also provides the use of a winding machine as defined above for making a gas turbine casing out of composite material.

BRIEF DESCRIPTION OF THE DRAWINGS

Other characteristics and advantages of the present invention appear from the following description made with reference to the accompanying drawings that show embodiments having no limiting character. In the figures:

FIGS. 4A and 4B are diagrams showing how the fiber texture stored on the takeup mandrel of the winding machine is placed on the impregnation mandrel prior to being wound;

FIGS. 8A and 8B are diagrammatic views of a winding machine in yet another variant embodiment of the invention.

DETAILED DESCRIPTION OF EMBODIMENTS

The invention is described below in the context of its application to fabricating a fan casing for a gas turbine aeroengine.

An example of a method of fabricating such a fan casing is described in document EP 1 961 923, to which reference may be made.

The casing is made of composite material comprising fiber reinforcement densified with a matrix. The reinforcement is made of fibers, e.g. carbon, glass, aramid, or ceramic fibers, and the matrix is made of polymer, e.g. epoxy, bismaleimide, or polyimide.

Briefly, the fabrication method described in this document consists in making a fiber texture by three-dimensional weaving with warp takeup on a drum (referred to below as a "takeup mandrel") having a profile that is determined as a function of the profile of the casing to be fabricated.

The fiber structure as made in this way is then transferred onto the mandrel of a resin injection mold (referred to below as the "impregnation" mandrel) of outside profile that corresponds to the inside profile of the casing to be fabricated. With the preform held on the impregnation mandrel, impregnation is then performed using a resin. For this purpose, a covering is applied over the preform and the resin is injected into the mold as constituted in this way. Impregnation may be assisted by establishing a pressure difference between the inside and the outside of the mold in which the preform is located. After impregnation, a step is performed of polymerizing the resin.

Figure 1:
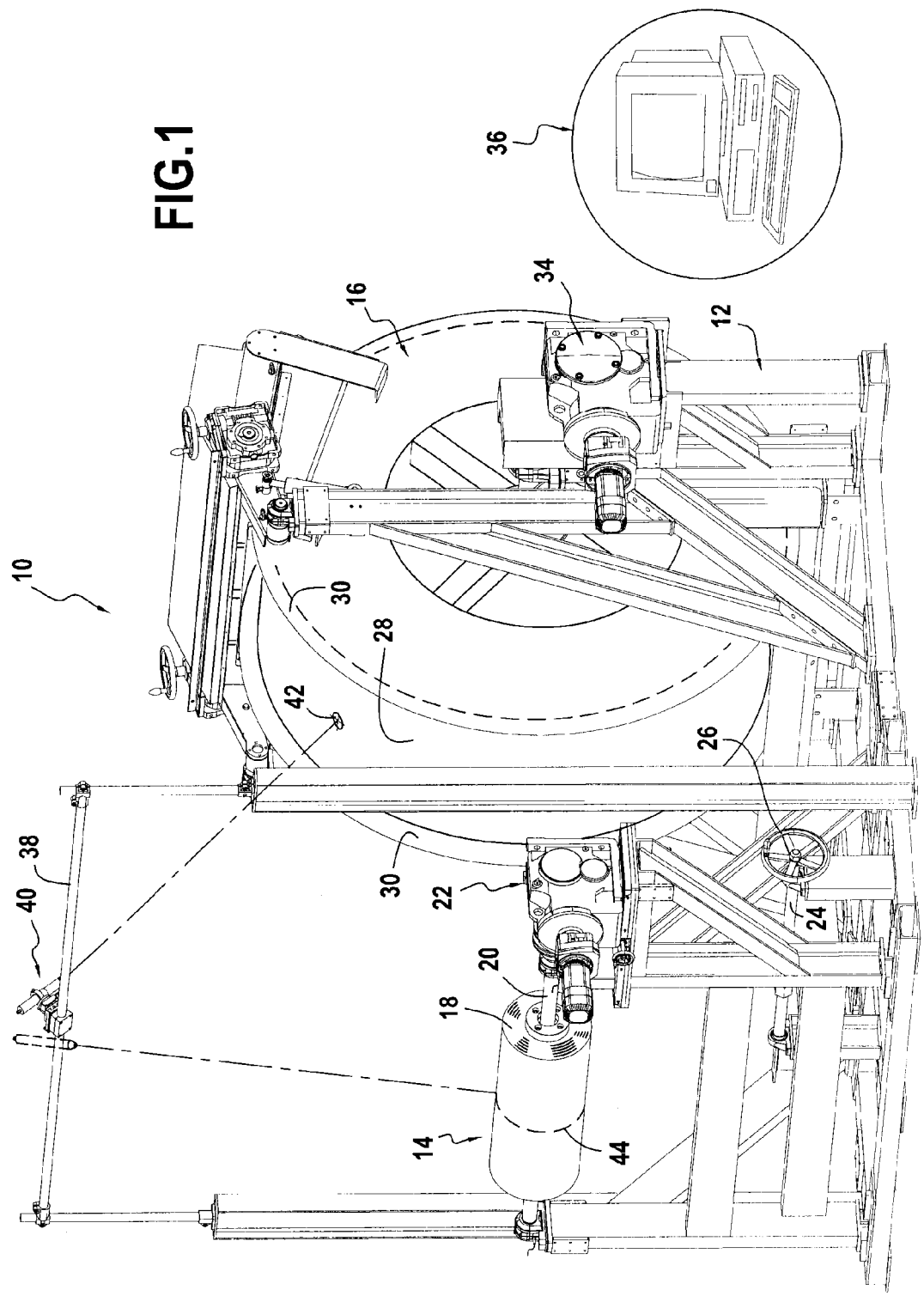
FIG. 1 is a perspective view of a winding machine of the invention.
Figure 2:
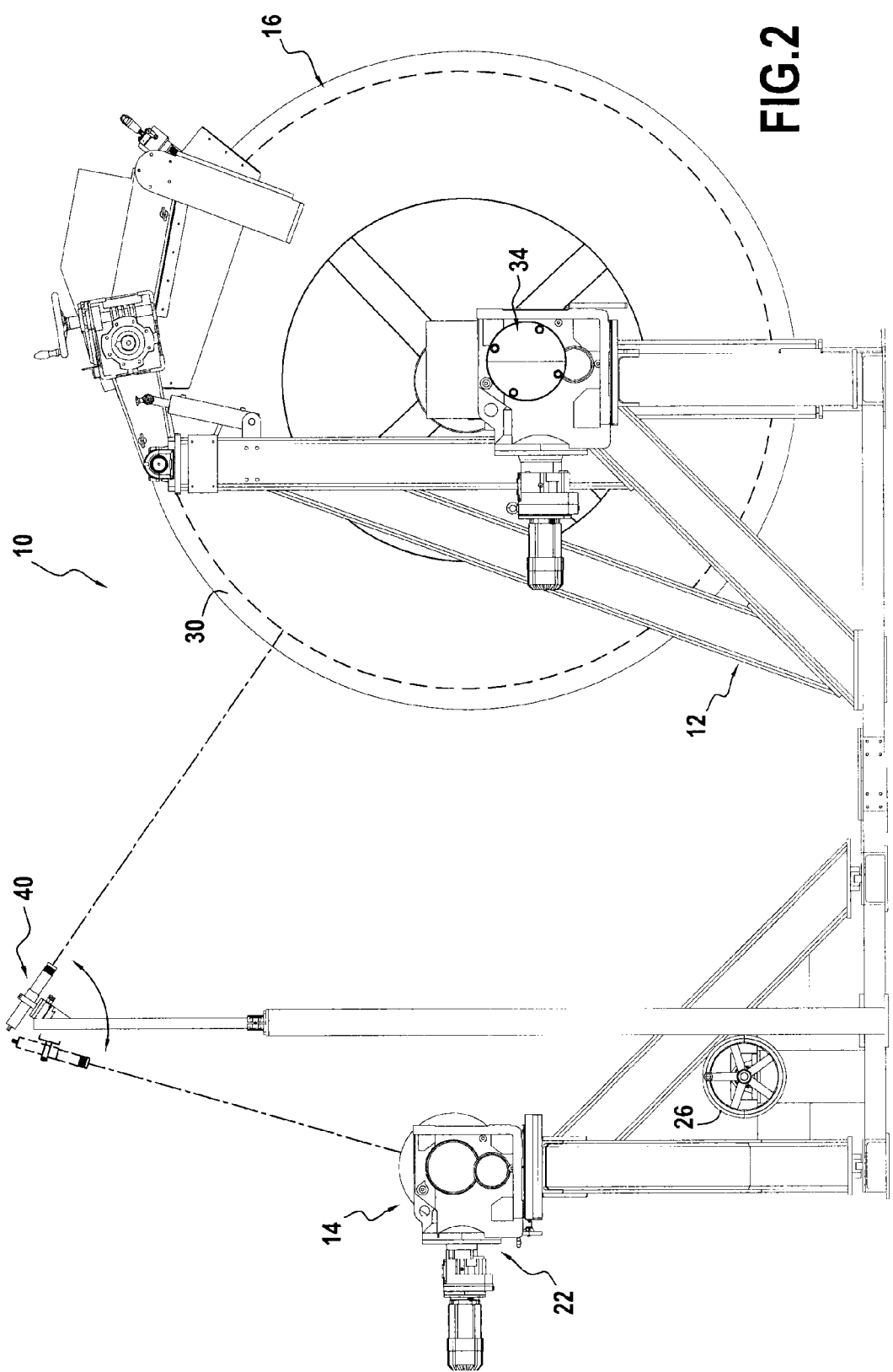
FIGS. 2 and 3 are views of the FIG. 1 winding machine respectively from the side and from above.
Figure 3:
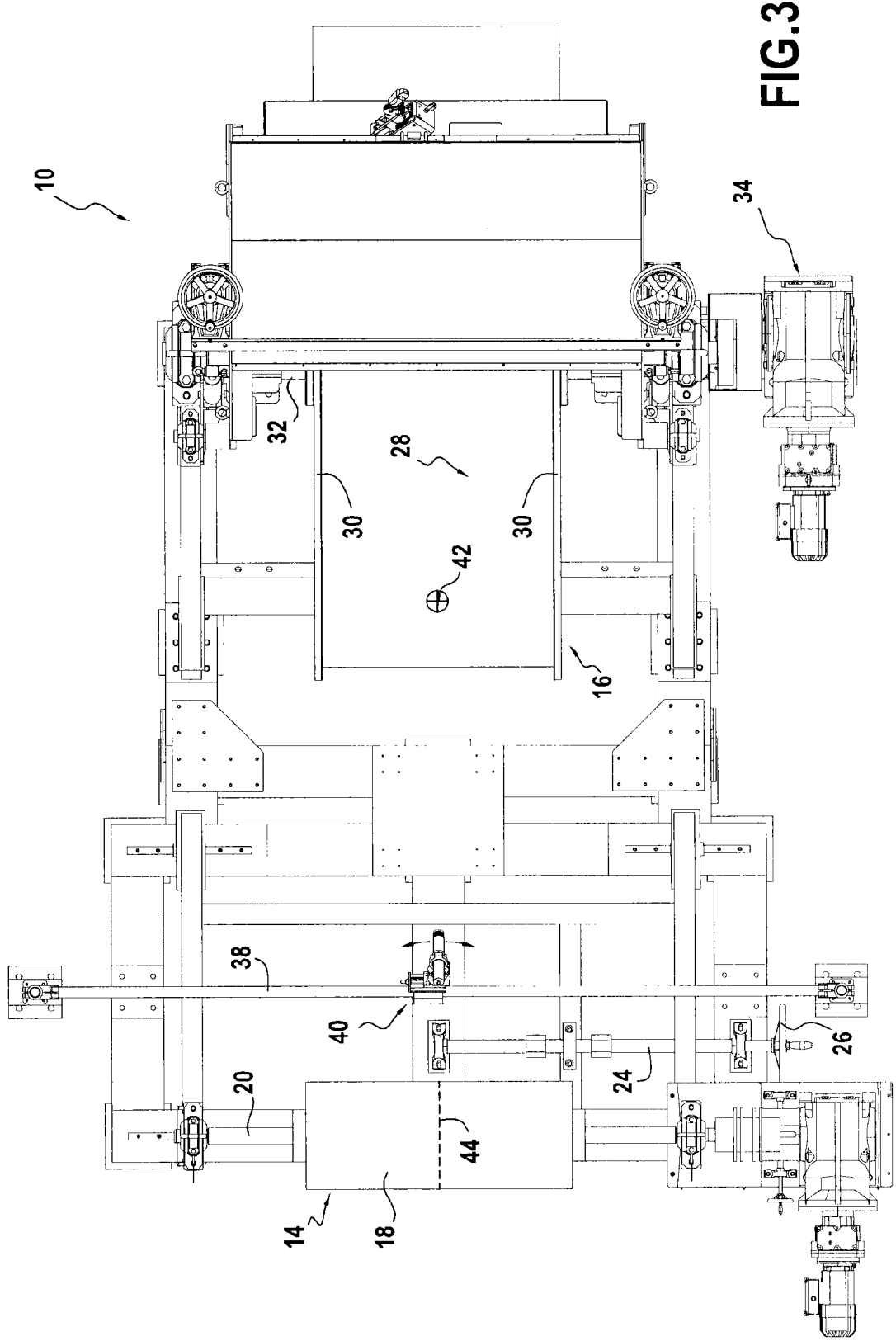

The winding machine shown in FIGS. 1 to 3 and constituting the subject matter of the invention serves during the method of fabricating the casing to perform automated transfer of the fiber texture stored on the takeup mandrel to the impregnation mandrel of the resin injection mold.

It should be observed that this winding machine does not apply only to fiber textures obtained exclusively by three-dimensional weaving as described below The winding machine 10 of the invention comprises a support structure 12 supporting in particular a takeup mandrel 14 and an impregnation mandrel 16. These mandrels are removable, i.e. they can be removed from the support structure.

The takeup mandrel 14 receives the fiber structure 18 obtained by three-dimensional weaving. It is carried by a shaft 20, e.g. a horizontal shaft, having one end mounted to rotate relative to the support structure 12 of the winding machine and having its other end connected to the outlet shaft of an electric motor 22, e.g. an alternating current (AC) electric gearmotor.

The assembly constituted by the takeup mandrel 14, its shaft 20, and its electric motor 22 may be moved in translation relative to the support structure along the axis of rotation of the takeup mandrel. As described below with reference to FIGS. 4A and 4B, this degree of freedom for the takeup mandrel to move in translation makes it possible to align this mandrel with the impregnation mandrel before beginning to wind the fiber texture onto the impregnation mandrel.

The system for moving the takeup mandrel in translation may be formed for example by a wormscrew type rod 24 coupled to the takeup mandrel and having one end fastened to the support structure 12 of the winding machine, and its other end fitted with a handwheel 26. Rotating the rod under drive from the handwheel thus causes the assembly constituted by the takeup mandrel 14, its shaft 20, and its electric motor 22 to move in translation relative to the support structure.

Naturally, the handwheel 26 serving to cause the takeup mandrel to move in translation along its axis of rotation may be driven manually or by motor.

The impregnation mandrel 16 of the winding machine of the invention is to receive superposed layers of the fiber texture stored on the takeup mandrel. It presents an outside surface 28 of profile corresponding to the profile of the inside surface of the casing that is to be made, together with two side plates 30.

The impregnation mandrel is carried by a shaft 32, e.g. a horizontal shaft (FIG. 3), that is parallel to the rotary shaft 20 of the takeup mandrel and that has one end mounted to rotate on the support structure 12 of the winding machine and its other end coupled to the outlet shaft of an electric motor 34, e.g. an AC electric gearmotor.

A control unit 36 is connected to the electric motors 22 and 34 of the two mandrels and enables the speed of rotation of each mandrel to be monitored and controlled. More generally, the control unit serves to govern all of the operating parameters of the winding machine, and in particular the movement in translation of the takeup mandrel when that is motor driven.

It should be observed that the winding machine may have a single electric motor for driving rotation of both mandrels, the electric motor being controlled by the above-described control unit. For this purpose, a cog belt serves to manage the winding tension and to perform unwinding, should that be necessary. Furthermore, an intermediate roller may be used to vary the winding tension.

The winding machine 10 also has a cross-beam 38 having optical sighting means mounted vertically above the mandrels in order to align the takeup mandrel on the on the impregnation mandrel prior to winding the fiber texture onto the impregnation mandrel.

More precisely, an optical sighting system 40 (e.g. a laser emitting a light beam) is pivotally mounted on the cross-beam above the mandrel. As shown in FIG. 1, this optical sighting system can pivot about the cross-beam 38 on which it is mounted so as to be capable of sighting one or the other of the mandrels of the winding machine. Naturally, it is possible to envisage an optical sighting system having an angle of projection that enables both mandrels to be covered. The optical sighting system also possesses a degree of freedom to move laterally that enables it to sight any point over the entire width of the outside surface 28 of the impregnation mandrel (FIG. 3).

The takeup mandrel 14 is aligned on the impregnation mandrel 16 prior to winding the fiber texture as follows.

Initially, a visual marker 42 is positioned on the outside structure 28 of the impregnation mandrel, and the optical sighting system 40 is actuated and moved laterally so as to align its light beam on the visual marker (FIG. 4A). The optical sighting system is then locked laterally in this position and is pivoted about the cross-beam 38 so as to be vertically over the takeup mandrel. In this position, the optical sighting system sights the fiber texture 18 round on the takeup mandrel 14.

For the takeup mandrel to be properly aligned on the impregnation mandrel, it is necessary to bring a particular warp yarn 44 of the fiber texture (referred to as a "tracer yarn") and of position in the fiber texture that is correlated with the position of the visual marker of the impregnation mandrel into alignment with the light beam emitted by the optical sighting system. For this purpose and as shown in FIG. 4B, the takeup mandrel is moved in translation along its axis of rotation by actuating the handwheel 26 until the tracer yarn 44 is in alignment with the light beam emitted by the optical sighting system.

Once the takeup mandrel is properly aligned on the impregnation mandrel, it is possible to begin winding the fiber texture onto the impregnation mandrel. The free end of the fiber texture of the takeup mandrel is initially fastened on the impregnation mandrel, and then the motors for driving the mandrels in rotation are activated and controlled, as described below.

Advantageously, provision is made to correct automatically any lack of alignment between the takeup mandrel and the impregnation mandrel that might occur during the operation of winding the fiber texture onto the impregnation mandrel.

To this end, a camera may be mounted on the cross-beam 38 vertically above the mandrels and pointed towards the fiber texture 18 wound on the takeup mandrel. The camera is connected to the control unit 36 of the winding machine, which unit processes the digital images coming from the camera during the operation of winding the fiber texture. Image processing software in the control unit continuously analyzes the images of the fiber texture in real time. In the event of a departure being detected between the light beam emitted by the optical sighting system 40 and the tracer yarn 44 incorporated in the fiber texture, the control unit 36 causes the takeup mandrel to move in translation in order to correct the departure. Naturally, operating in this way requires the use of an electric motor to drive rotation of the rod that serves to move the takeup mandrel in translation along its axis of rotation.

Figure 5:
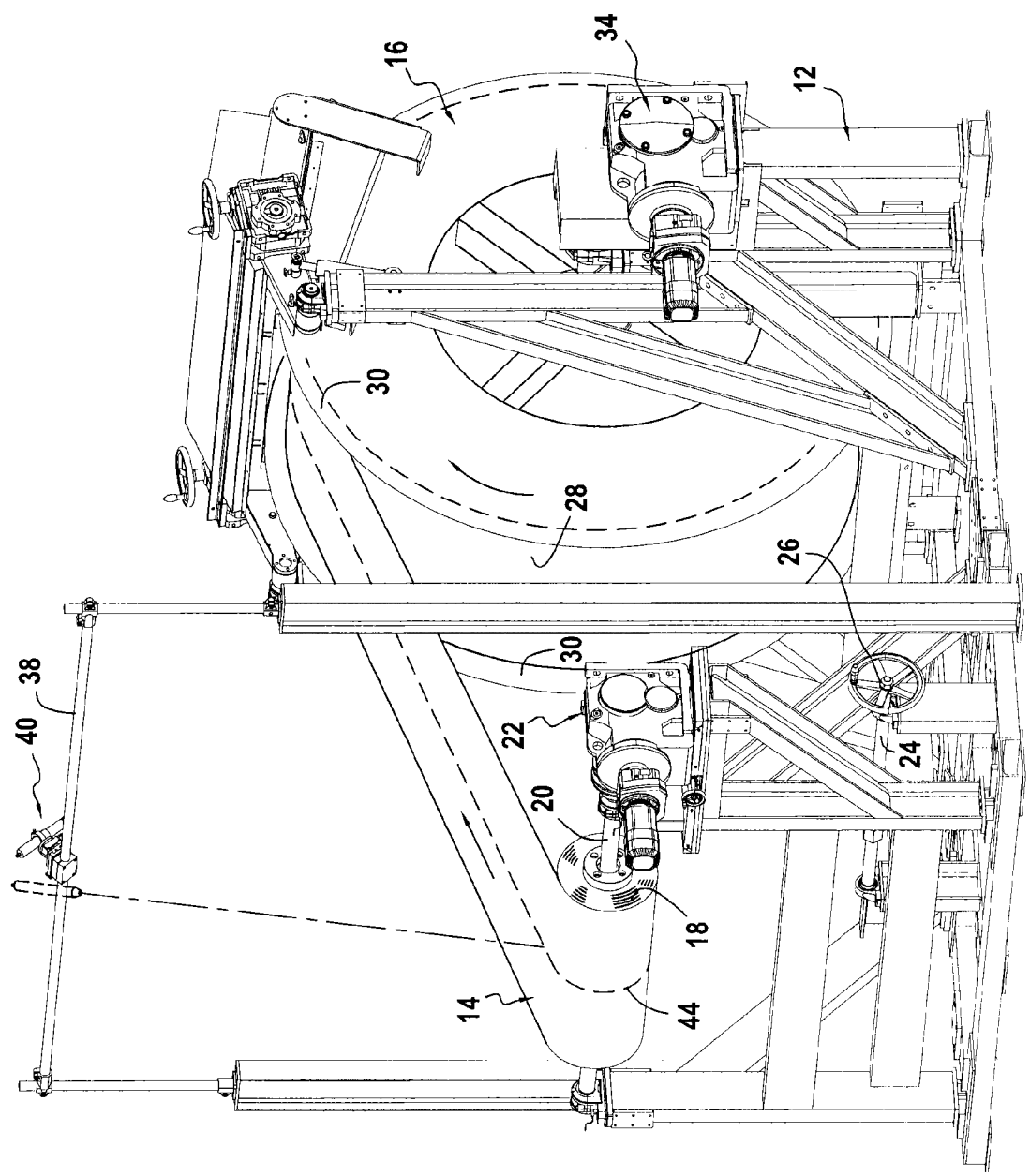
FIG. 5 is a perspective view of the winding machine of FIGS. 1 to 3 in operation.

With reference to FIG. 5, there follows a description of how the fiber texture is wound on the impregnation mandrel. As mentioned above, once the free end of the fiber texture has been fastened on the impregnation mandrel, the electric motors for driving the takeup mandrel and the impregnation mandrel in rotation are activated and controlled by the control unit.

The fiber texture should be wound as superposed layers on the impregnation mandrel while applying an appropriate winding tension on the fiber texture.

For this purpose, a setpoint tension is predefined as a function in particular of the nature of the fiber structure, and it is applied to that one of the mandrels that offers torque opposing the winding, i.e. generally the takeup mandrel. More precisely, the setpoint tension is input into the control unit, which converts it into a setpoint value for the induction current of the electric motor of the takeup mandrel by using an appropriate calculation algorithm.

This calculation algorithm serves to associate a setpoint voltage value with a value for the induction current of the electric motor of the takeup mandrel (when it is the takeup mandrel that opposes resistance), which current value is previously obtained in particular by taking account of the mean radius of the mandrel. The algorithm may be re-evaluated where necessary when departures appear between the setpoint tension and a real tension as measured during maintenance operations with the help of a dynamometer connected by belts to the takeup mandrel and to the impregnation mandrel.

It should be observed that the setpoint tension varies as a function in particular of the nature of the fibers constituting the fiber texture to be wound onto the impregnation mandrel and on parameters used while weaving it.

By way of example, for a fiber texture constituted by an interlock type three-dimensional multilayer fabric made of carbon fibers of intermediate modulus, a setpoint tension should be applied that lies in the range 6000 newtons (N) to 15,000 N, with the fabric traveling at a winding speed lying in the range 200 millimeters per minute (mm/min) to 400 mm/min. For this particular fiber texture, such values make it possible to obtain an appropriate level of compacting of the superposed layers of fiber texture on the impregnation mandrel. This results in well-controlled fiber density in the fiber preform that is obtained at the end of the subsequent resin impregnation step.

It should also be observed that the process of winding the fiber texture on the impregnation mandrel is reversible, i.e. it is possible to unwind the fiber texture back onto the takeup mandrel. This unwinding operation, which is performed with controlled winding tension and speed, may be used in the event of a weaving defect being detected late, or in the event of misalignment while winding onto the impregnation mandrel, thereby enabling the operation to be returned to an earlier stage.

With reference to FIGS. 6, 7, 8A, and 8B, there follows a description of several variant embodiments of the winding machine of the invention. In these variants, the winding machines all present the characteristics as described above.

Figure 6:
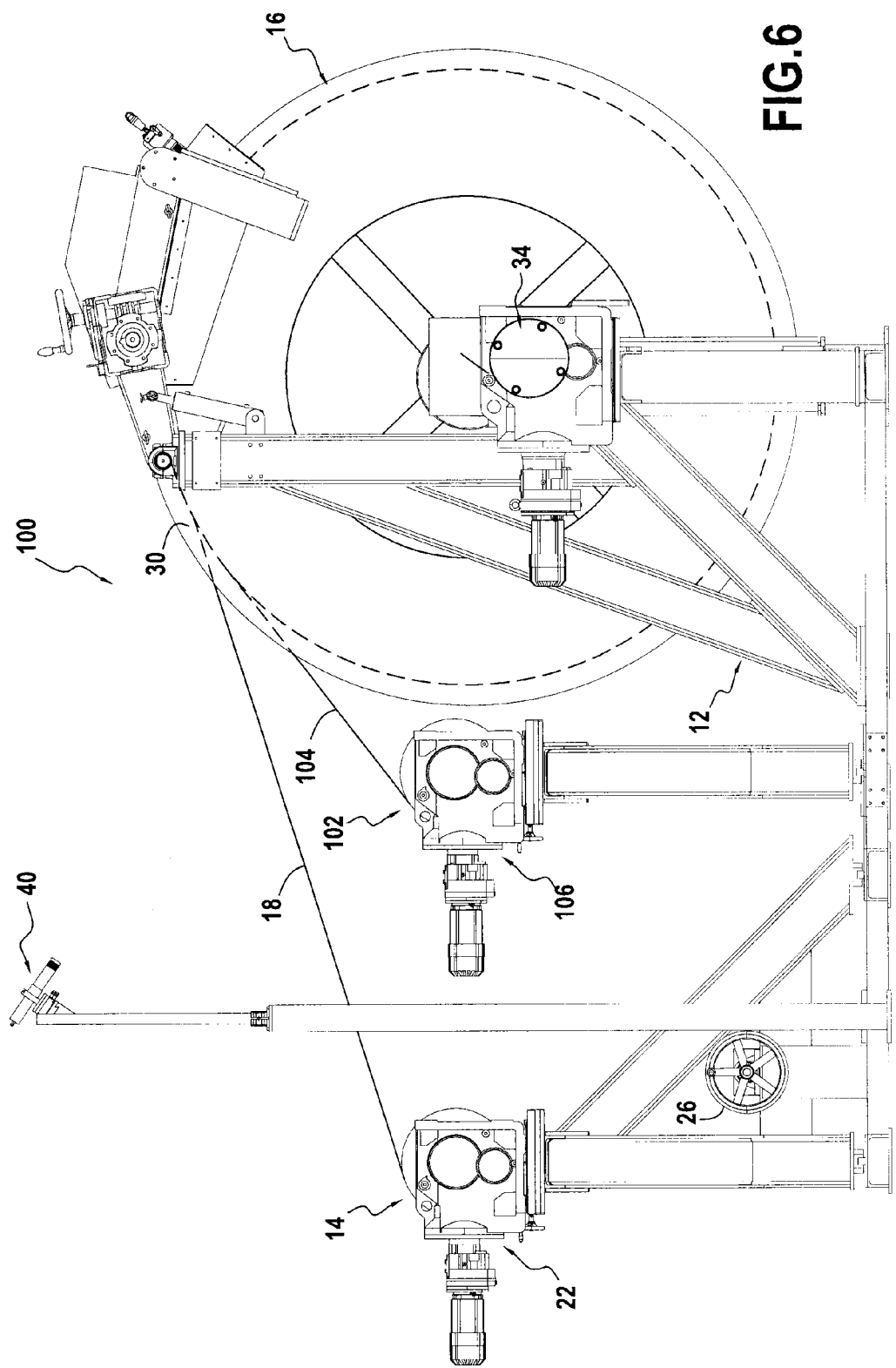
FIG. 6 is a diagrammatic side view of a winding machine in a variant embodiment of the invention.

The winding machine 100 shown in FIG. 6 also possesses an additional mandrel 102 having a reinforcing fiber fabric 104 stored thereon. By way of example, this reinforcing fabric may be an interlock type three-dimensional multilayer fabric made of carbon fibers of intermediate modulus or of any other woven, braided, or unidirectional fiber reinforcement.

This additional mandrel 102 is carried by a horizontal shaft (not shown in FIG. 6) that is parallel to the respective axes of rotation of the takeup mandrel 14 and of the impregnation mandrel 16. This horizontal shaft has one end that is rotatably mounted on the support structure 12 of the winding machine and another end that is coupled to the outlet shaft of an electric motor 106, e.g. an AC electric gearmotor, under the control of the above-described control unit (not shown in FIG. 6).

The process of winding the reinforcing fiber fabric onto the impregnation mandrel is completely identical to that described for winding the fiber texture onto the impregnation mandrel. In particular, the control unit serves to control the speed of rotation of the additional mandrel and, by controlling the induction current of the electric motor of the takeup mandrel, it is possible to control the winding tension applied to the reinforcing fabric throughout its winding.

Figure 7:
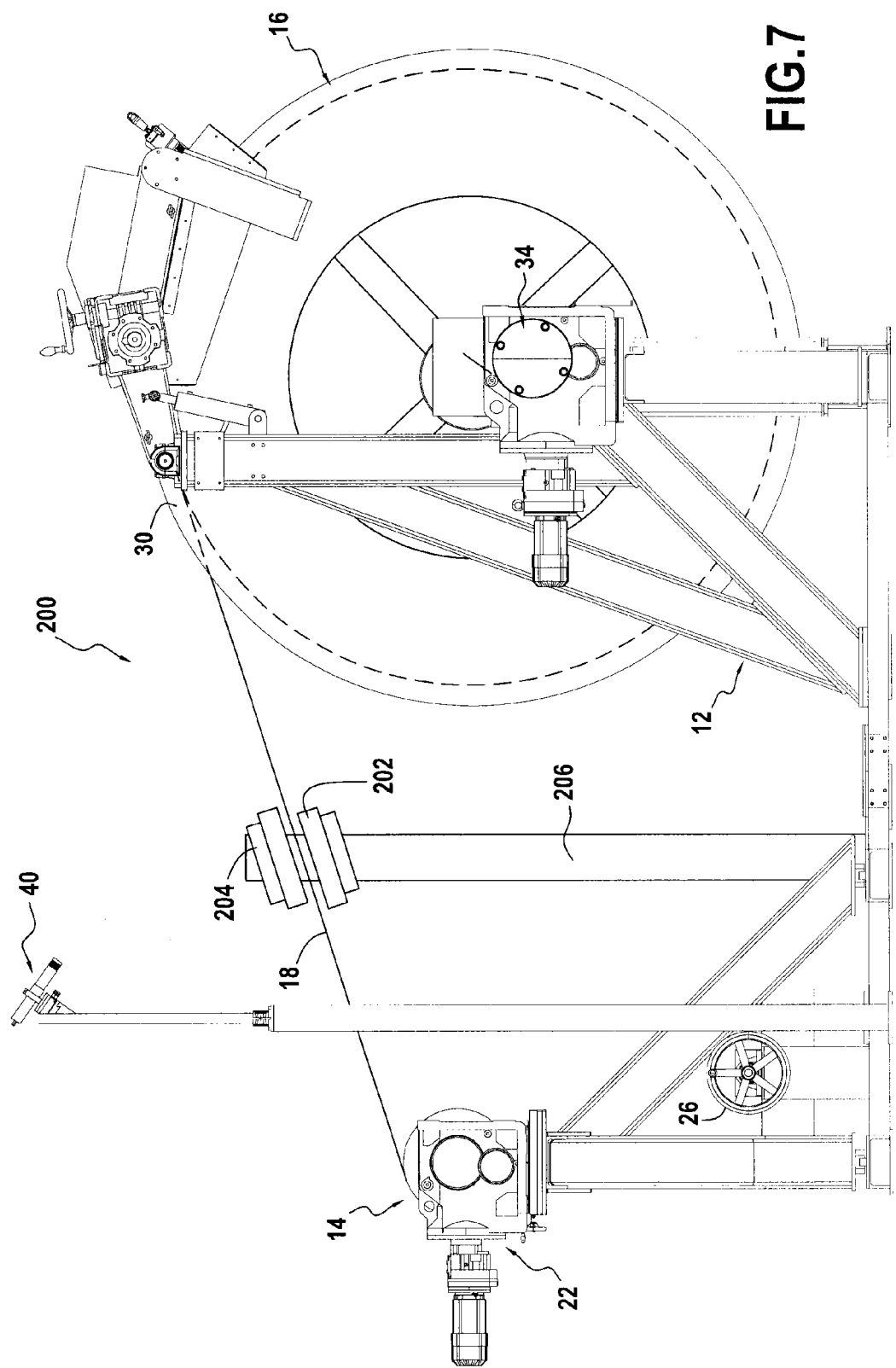
FIG. 7 is a diagrammatic side view of a winding machine in another variant embodiment of the invention.

The winding machine 200 shown in FIG. 7 possesses means for heating the fiber texture prior to docking it on the impregnation mandrel. It is known that heating the fiber texture prior to docking it on the impregnation mandrel makes it easier to shape it and to compact it on the impregnation mandrel.

Thus, this variant embodiment is provided with two heater units 202, 204 (radiant heaters or hot air blowers, for example) that are mounted on a cross-beam 206 secured to the support structure 12 of the winding machine and that are positioned on the path of the fiber texture 18 between the takeup mandrel 14 and the impregnation mandrel 16. More precisely, these heater units are placed facing each of the faces of the fiber texture.

Furthermore, these heater units 202 and 204 are controlled by the above-described control unit. Typically, the heating temperature is adjustable in the range lying between 40° C. to 90° C. The heater units are controlled so as to adapt automatically to the winding speed, even in the event of winding stopping, so as to maintain the fiber texture at the desired temperature.

Finally, the winding machine 300 in the variant embodiment of FIGS. 8A and 8B possesses means for spraying water onto the fiber texture prior to the texture docking on the impregnation mandrel. As with heating, spraying water on the fiber texture prior to it docking on the impregnation mandrel likewise makes it easier for it to be shaped on the mandrel by softening it by allowing the fibers to slide on one another.

In this variant embodiment, a strip 302 mounted on the support structure 12 of the winding machine is provided to carry a plurality of water spray nozzles 304 that are positioned vertically above the takeup mandrel 14 facing the fiber texture 18 wound thereon. By way of example, the water may be demineralized water. These nozzles are distributed over the entire width of the takeup mandrel so as to enable the fiber texture to be moistened across its entire width.

Furthermore, the rate at which water is sprayed by these nozzles may be adjusted manually or it may be controlled by the above-described control unit, e.g. so as to adapt automatically to the speed at which the fiber texture is being wound onto the impregnation mandrel, so as to ensure that the fiber texture is moistened to a constant level regardless of the winding speed.

The invention claimed is:

1. A winding machine for winding a fiber texture on an impregnation mandrel, the winding machine comprising:
   a takeup mandrel for storing a fiber texture, the takeup mandrel having an axis of rotation;
   an impregnation mandrel for having superposed layers of the fiber texture stored on the takeup mandrel wound thereon, the impregnation mandrel having an axis of rotation that is substantially parallel to the axis of rotation of the takeup mandrel;
   at least one electric motor for driving the mandrels in rotation about their respective axes of rotation; and
   an electronic controller configured to control the at least one electric motor for driving the mandrels in rotation,
   wherein the electronic controller is configured to control an induction current of an electric motor of the takeup mandrel to wind the fiber texture onto the impregnation mandrel while exerting controlled tension thereon, the induction current of the takeup mandrel being based on a predetermined setpoint tension of the fiber texture and a calculation algorithm which associates a setpoint voltage value converted from the setpoint tension with a value of the induction current of the takeup mandrel,
   wherein the predetermined setpoint tension of the fiber texture is based on characteristics of fibers constituting the fiber texture and parameters used during weaving of the fiber texture, and
   wherein the value of the induction current of the takeup mandrel is a function of a mean radius of the takeup mandrel.

2. A machine according to claim 1, further comprising optical sighting means for aligning the takeup mandrel on the impregnation mandrel prior to winding the fiber texture onto the impregnation mandrel and for correcting any defect in an alignment of the takeup mandrel on the impregnation mandrel during the winding operation.

3. A machine according to claim 2, wherein the optical sighting means comprises an optical sighting system mounted on a cross-beam vertically above the mandrels, a visual marker positioned on the impregnation mandrel, and a system for moving the takeup mandrel in translation.

4. A machine according to claim 1, further comprising:
   an additional mandrel for storing a reinforcing fiber fabric, the additional mandrel having an axis of rotation that is substantially horizontal and parallel to the respective axes of rotation of the mandrels; and
   an additional electric motor for riving rotation of the additional mandrel about its axis of rotation.

5. A machine according to claim 1, further comprising heater means for heating the fiber texture prior to the texture docking on the impregnation mandrel.

6. A machine according to claim 5, wherein the fiber texture heater means comprises radiant heater units or hot air blower units positioned on a path of the fiber texture between the takeup mandrel and the impregnation mandrel and facing each of faces of the texture.

7. A machine according to claim 1, further comprising water spray means for spraying water on the fiber texture prior to the texture docking on the impregnation mandrel.

8. A machine according to claim 7, wherein the water spray means for spraying water on the fiber texture comprises a strip carrying a plurality of water spray nozzles positioned vertically above the takeup mandrel.

9. A method for manufacturing a gas turbine casing out of composite material, comprising:
   winding a fiber texture around an impregnation mandrel using a winding machine according to claim 1.

* * * * *